Dec. 21, 1965
C. R. WEISEND
APPARATUS FOR MAINTAINING CONSTANT THE
TEMPERATURE OF A FLOW
OF CRYOGENIC GAS
3,225,174
Filed Aug. 10, 1962
2 Sheets-Sheet 1
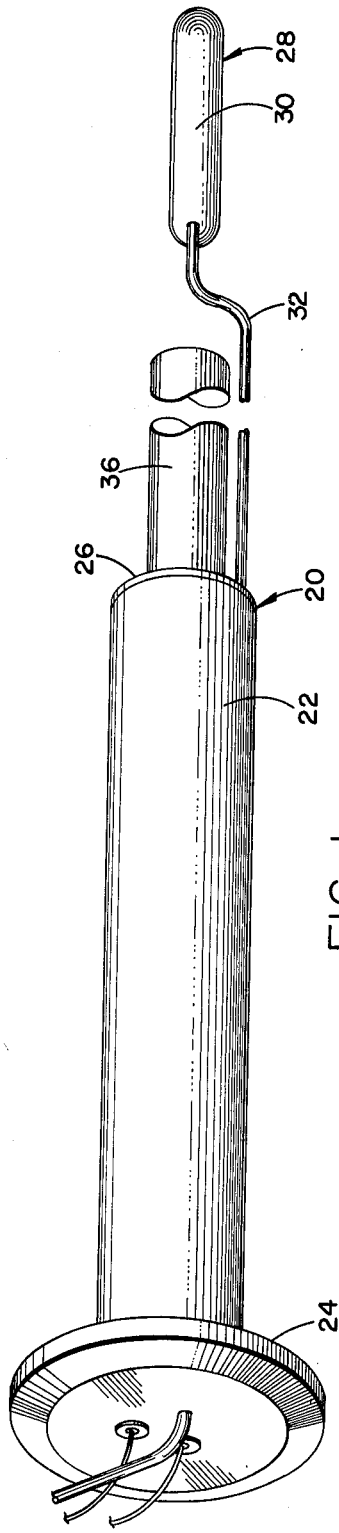
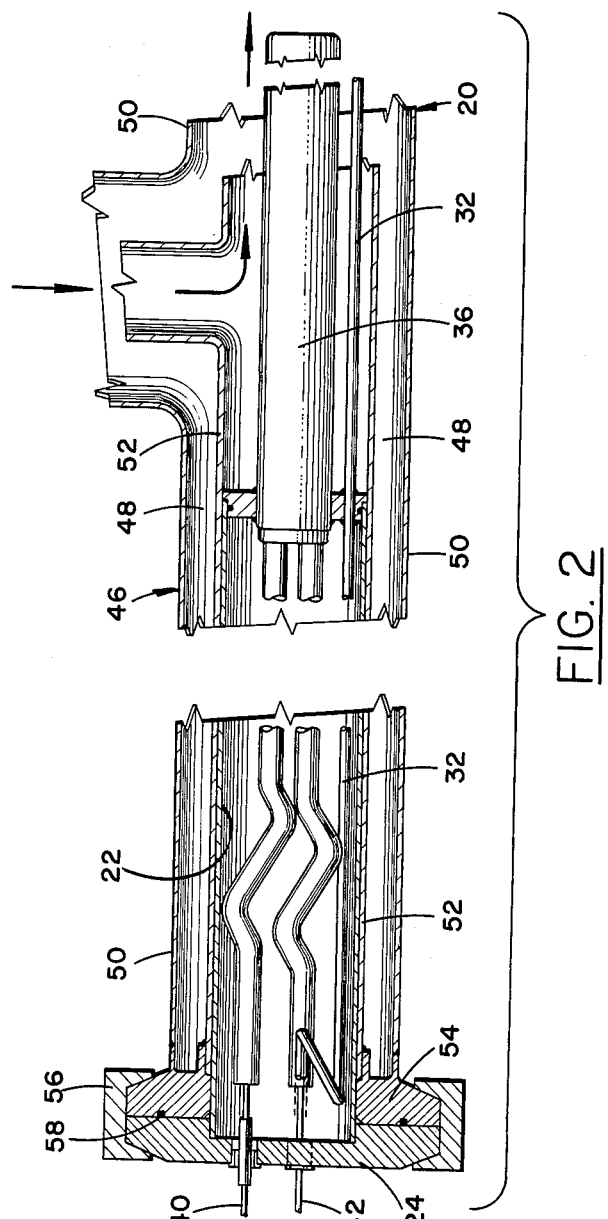
INVENTOR.
CHARLES R. WEISEND
BY
*Schmieding and Fultz*
ATTORNEYS Dec. 21, 1965
C. R. WEISEND
3,225,174
APPARATUS FOR MAINTAINING CONSTANT THE
TEMPERATURE OF A FLOW
OF CRYOGENIC GAS Filed Aug. 10, 1962

INVENTOR.
CHARLES R. WEISEND
BY
Schmieding and Fultz
ATTORNEYS

United States Patent Office 3,225,174
Patented Dec. 21, 1965

3,225,174
APPARATUS FOR MAINTAINING CONSTANT THE TEMPERATURE OF A FLOW OF CRYOGENIC GAS
Charles R. Weisend, Columbus, Ohio, assignor to Cryovac, Inc., Columbus, Ohio, a corporation of Ohio
Filed Aug. 10, 1962, Ser. No. 216,085
4 Claims. (Cl. 219—381)

This invention relates to temperautre control apparatus for a flow of cryogenic gas and particularly to maintaining the temperature of a gas flow at various temperature values within a selected control range.

In general, the apparatus of the present invention comprises a tubular housing in which are mounted a pressure sensing means and a heating element. The housing is extended through the wall of the conduit containing the flowing gas to be controlled in sealed relationship therewith such that the sensing means and heating element are in physical contact with the cold flowing gas.

The above sensing means is in the form of a bulb containing a saturated cryogenic gas having a boiling point temperature above the boiling point temperature of the flowing cryogenic gas being controlled and falling within the upper and lower temperature limitation of the selected control range. For example, hydrogen, having a boiling point of 20.4 degrees Kelvin is used as the saturated control gas within the bulb for maintaining constant the temperature of the flow of gaseous Helium within a selected temperature range of from 14.5 to 27 degrees Kelvin, the boiling point of helium being 4 degrees Kelvin, a value below that of hydrogen.

In general, the previously mentioned heating means is electrically connected to a variable power voltage source, such as a variable voltage transformer, and the interior of the bulb is connected by a conduit means to an external pressure responsive control means for varying the power delivered to the heating element. Hence, it will be understood that when the temperature of the flowing gas decreases below the selected value, say 20 degrees Kelvin, the saturated gas within the bulb and conduit decreases in pressure and the control apparatus automatically increases the heating effect delivered to the heating element disposed in the flowing gaseous helium. Conversely, when the temperature of the flow increases, the saturated control gas within the bulb expands thereby causing a decrease in the heating effect applied to the flowing gaseous helium.

The control apparatus of the present invention is applicable to cryogenic refrigerator cycles such as the cycle used in the helium refrigeration system disclosed in United States Letters Patent No. 3,125,863 issued March 24, 1964.

As a principal advantage of the present invention the control apparatus utilizes a characteristic of a saturated cryogenic gas where the vapor pressure depends only on gas temperature with the result that the apparatus requires no calibration.

The control apparatus of the present invention is advantageous in cryogenic applications in that it delivers a high pressure variation signal to a pressure responsive controller responsive to a relatively small change in the temperature of the gaseous flow being controlled. In instances where hydrogen is used as the control gas for flowing helium, the pressure change is 8 pounds per square inch per degree Kelvin.

As another advantage the pressure responsive controller and associated sensor of the present invention are made up of simple mechanical components as compared with more complex and expensive electrical devices.

It is, therefore, an object of the present invention to provide a constant temperature control apparatus for a cryogenic gas which utilizes a second cryogenic gas having a higher boiling point to control the temperature of the first cryogenic gas at selected values within a temperature range that embraces the boiling point temperature of the second cryogenic gas.

It is another object of the present invention to provide a constant temperature control apparatus for cryogenic gas that requires no calibration.

It is another object of the present invention to provide a constant temperature control apparatus for a cryogenic gas that utilizes the variable pressure of a saturated second cryogenic gas to produce relatively large control pressure signals for small changes in the temperature of the gas being controlled.

It is still another object of the present invention to provide a constant temperature control apparatus for a cryogenic gas that utilizes simple and inexpensive mechanical components.

Further objects and advantages of the present invention will be apparent from the following description, reference being had to the accompanying drawings wherein a preferred form of embodiment of the invention is clearly shown.

In the drawings:

FIG. 1 is a perspective view of a sensing means and heating element assembly comprising a portion of the apparatus of the present invention;

FIG. 2 is a fragmentary side sectional view of the assembly of FIG. 1, the section being taken along a vertical plane through the center line of the assembly;

Referring in detail to the drawings, FIGS. 1 and 2 illustrate a sensing means and heating element assembly indicated generally at 20 that includes a tubular housing 22 provided with an end closure 24 and an open inner end 26.

Figure 3:
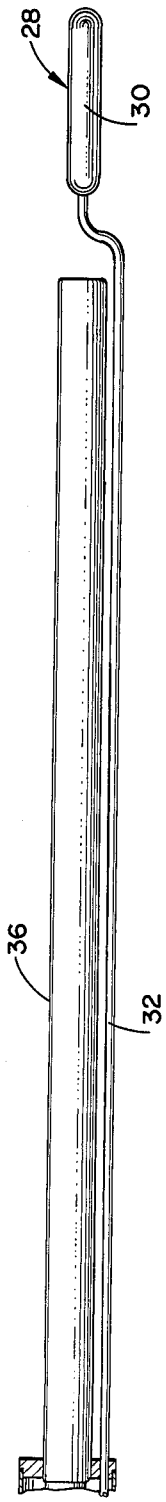
FIG. 3 is a side elevational view of the heating element and sensing means of the preceding figures.

With reference to FIGS. 1–3, the apparatus further includes a sensing means indicated generally at 28 in the form of a bulb 30 disposed within the flow path of the controlled gas containing a saturated cryogenic gas such as hydrogen at 20.4 degrees Kelvin and one atmosphere of pressure.

Figure 4:
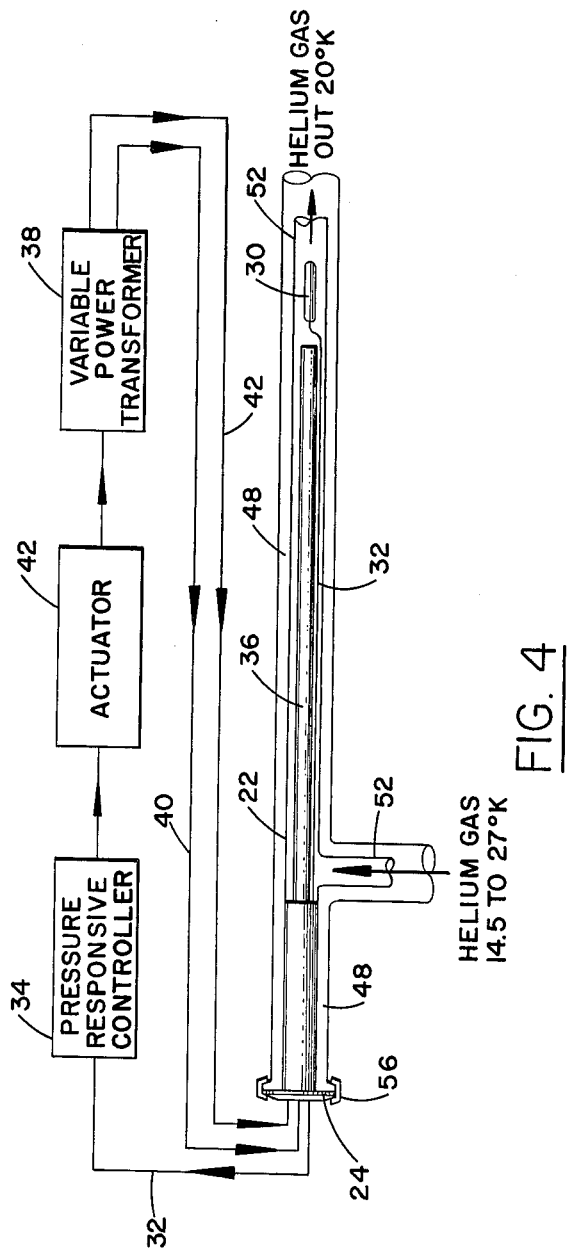
FIG. 4 is a diagrammatic view of the entire control apparatus of the present invention.

A tubular conduit 32 connects bulb 30 with a pressure responsive controller diagrammatically indicated at 34 in FIG. 4.

As is best seen in FIG. 3, a heating element 36 is mounted in tubular housing 22 and is connected to a source of thermal energy, preferably in the form of variable power transformer 38, by wires 40 and 42.

Pressure responsive controller 34 operates the power control lever of variable power transformer 38 by means of an actuator diagrammatically illustrated at 44 in FIG. 4 which may be in the form of an air operated conomotors type power actuator, the latter being an air cylinder type device with an inlet and associated valve controlled by pressure responsive controller 34.

As is seen in FIGS. 2 and 4 tubular housing 22 is surrounded by a vacuum jacketing means indicated generally at 46 that includes a vacuum space 48 formed by an outer wall 50 and an inner wall 52, the latter forming the conduit for conducting the flow of cryogenic gas being controlled.

With reference to FIG. 2 the tubular housing casing 22 is removably inserted in the fluid conducting conduit 52 with end closure 24 clamped snuggly against a flange 54 by a clamp ring 56, a seal being provided between end closure 24 and flange 54 by a resilient seal 58.

In operation, a flow of helium gas such as used in the cryogenic refrigeration cycle described in detail in United States Letters Patent No. 3,125,863 issued March 24, 1964, is discharged from a load, such as a space simulation chamber where heat is absorbed by the flowing gas, and passed through conduit 52 leading to an apparatus at which gas delivery temperature is critical, such as a low temperature heat exchanger of the type disclosed in the previously mentioned co-pending application relating to a helium refrigeration cycle.

In the helium refrigeration cycle referred to the temperature of the helium gas leaving the load varies from 14.5 to 27 degrees Kelvin and it is desirable to deliver the gas to the low temperature heat exchanger at 20 degrees Kelvin in order to maintain a low temperature differential in the exchanger. This precise control is achieved by the apparatus of the present invention.

If the temperature of the flowing helium gas in conduit 52 is too cold, say 15 degrees Kelvin, the saturated hydrogen gas in bulb 30, at 20.4 Kelvin and one atmosphere, is chilled whereby the gas pressure in line 32 decreases. This pressure decrease is sensed in pressure responsive controller 34 which causes actuator 42 to move the lever of variable power transformer 38 in a direction that increases the power and hence heating effect delivered by heater element 36 to the flowing helium gas which is in physical contact with the heating element.

When the helium gas is warmed by heating element 36 to the desired output temperature of 20 degrees Kelvin pressure responsive controller 34 has functioned to decrease the power delivered to the heating element by operating transformer 38 as required.

Conversely, if the flowing helium gas in conduit 52, upstream of bulb 30, is too warm, say 25 degrees Kelvin, the saturated hydrogen gas in bulb 30 is expanded and the increased pressure in tube 32 is sensed by pressure responsive controller 34 and causes actuator 42 to move the lever of variable transformer 38 in a direction to decrease the heating effect delivered to heating element 36 as may be required to drop the temperature of the flowing helium gas, downstream of heating element 36, to the desired output temperature of 20 degrees Kelvin. It should be pointed out that the controlled gas helium and the controlling gas hydrogen were selected as practical examples of the present invention where it is desired to use a higher boiling point saturated cryogenic gas to maintain constant temperatures for a cryogenic gas of lower boiling point where the boiling point of the controlling gas lies within the desired control range.

It will be understood that other controlled and controlling gases can be used without departing from the spirit of the present invention. For example, saturated neon could be used for controlling the temperature of a cryogenic gas within the temperature range of say 24–30 degrees Kelvin since the boiling point of neon lies within this range. As another example, saturated nitrogen could be used for maintaining selected temperatures within the control range of 65–100 degrees Kelvin which range embraces the boiling point of nitrogen.

While the form of embodiment of the present invention as herein disclosed constitutes a preferred form, it is to be understood that other forms might be adopted, all coming within the scope of the claims which follow.

I claim:

1. An apparatus for maintaining constant the temperature of a flow of cryogenic gas at various temperature values within a selected control range, said apparatus comprising, in combination, conduit means for said flow of cryogenic gas; temperature sensing means disposed in said flow and including a bulb containing a saturated cryogenic gas having a boiling point temperature falling within said selected control range; heating means disposed in said flow; pressure responsive control means for varying the rate of delivery of thermal energy from said heating means; passage means for said saturated cryogenic gas connecting said bulb with said pressure responsive control means; a tubular housing provided with an end closure, said passage means being extended through said end closure; and vacuum jacketing means surrounding said conduit means and provided with an opening, said tubular housing being extended through said opening and within said conduit means.

2. An apparatus for maintaining constant the temperature of a flow of cryogenic gas at various temperature values within a selected control range, said apparatus comprising, in combination conduit means for said flow of cryogenic gas, temperature sensing means disposed in said flow and including a bulb containing a saturated cryogenic gas having a boiling point temperature falling within said selected control range; an electrical heating coil disposed in said flow; a variable power transformer; a plurality of conductors connecting said heating coil with said transformer; pressure responsive control means for varying the power output of said transformer; passage means for said saturated cryogenic gas connecting said bulb with said pressure responsive control means; a tubular housing provided with an end closure, said passage means being extended through said end closure; and vacuum jacketing means surrounding said conduit means and provided with an opening, said tubular housing being extended through said opening and within said conduit means.

3. An apparatus for maintaining constant the temperature of a flow of helium gas at various temperatures between 14.5° Kelvin and 27° Kelvin, said apparatus comprising, in combination, conduit means for said flow of helium gas; temperature sensing means disposed in said flow and including a bulb containing saturated hydrogen at approximately 20.4° Kelvin; heating means disposed in said flow; means forming a source of electrical energy connected to said heating means; pressure responsive control means for varying the rate of delivery of electrical energy from said source to said heating means; passage means for said saturated hydrogen gas connecting said bulb with said pressure responsive control means; a tubular housing provided with an end closure, said passage means being extended through said end closure; and vacuum jacketing means surrounding said conduit means and provided with an opening, said tubular housing being extended through said opening and within said conduit means.

4. An apparatus for maintaining constant the temperature of a flow of helium gas at various temperatures between 14.5° Kelvin and 27° Kelvin, said apparatus comprising, in combination, conduit means for said flow of helium gas; temperature sensing means disposed in said flow and including a bulb containing saturated hydrogen at approximately 20.4° Kelvin; an electrical heating coil disposed in said flow; a variable power transformer; a plurality of conductors connecting said heating coil with said transformer; pressure responsive control means for varying the power output of said transformer; and passage means for said saturated cryogenic gas connecting said bulb with said pressure responsive control means; a tubular housing provided with an end closure, said passage means being extended through said end closure; and vacuum jacketing means surrounding said conduit means and provided with an opening, said tubular housing being extended through said opening and within said conduit means.

References Cited by the Examiner

UNITED STATES PATENTS

| | | | |
|---|---|---|---|
| 1,175,234 | 3/1916 | Burroughs et al. | 219—306 |
| 1,764,139 | 6/1930 | Alex | 219—331 X |
| 2,186,984 | 1/1940 | McCloy. | |
| 2,437,262 | 3/1948 | Levitt et al. | 219—328 X |
| 2,596,327 | 5/1952 | Cox et al. | 219—381 |
| 2,695,353 | 11/1954 | Witschonke | 219—503 |
| 2,775,683 | 12/1956 | Kleist | 219—381 X |

FOREIGN PATENTS 620,838  3/1949  Great Britain.

RICHARD M. WOOD, *Primary Examiner.*

ANTHONY BARTIS, *Examiner.*